Sept. 11, 1956

G. P. MAURER 2,762,268

GEAR CROWNING MACHINE

Filed Aug. 25, 1952

INVENTOR.
George P. Maurer
BY

Attorney

Sept. 11, 1956  G. P. MAURER  2,762,268
GEAR CROWNING MACHINE
Filed Aug. 25, 1952  6 Sheets—Sheet 2

INVENTOR.
George P. Maurer
BY
Attorney

Sept. 11, 1956

G. P. MAURER 2,762,268

GEAR CROWNING MACHINE

Filed Aug. 25, 1952

INVENTOR.
George P. Maurer
BY
Ralph Hirshman
Attorney

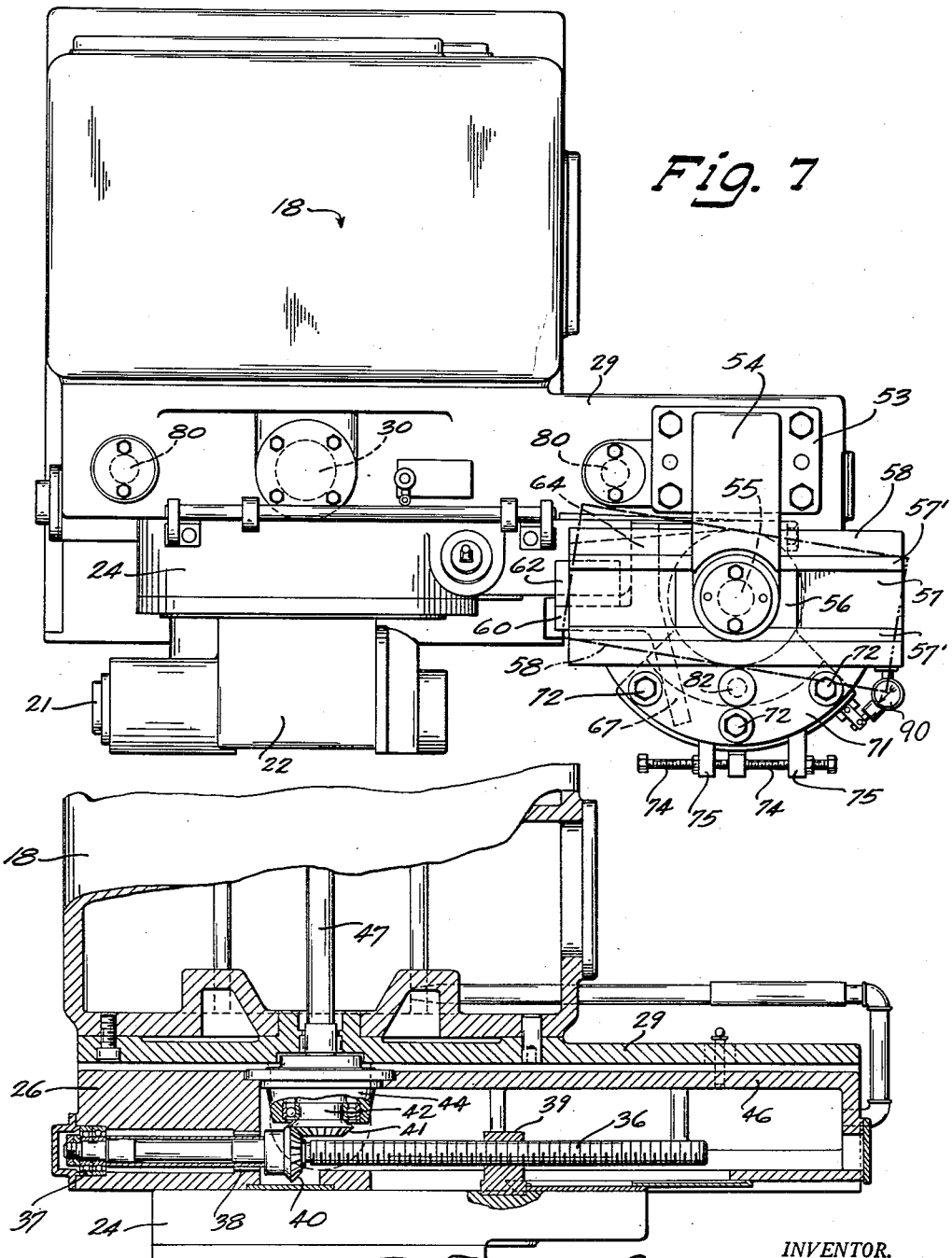

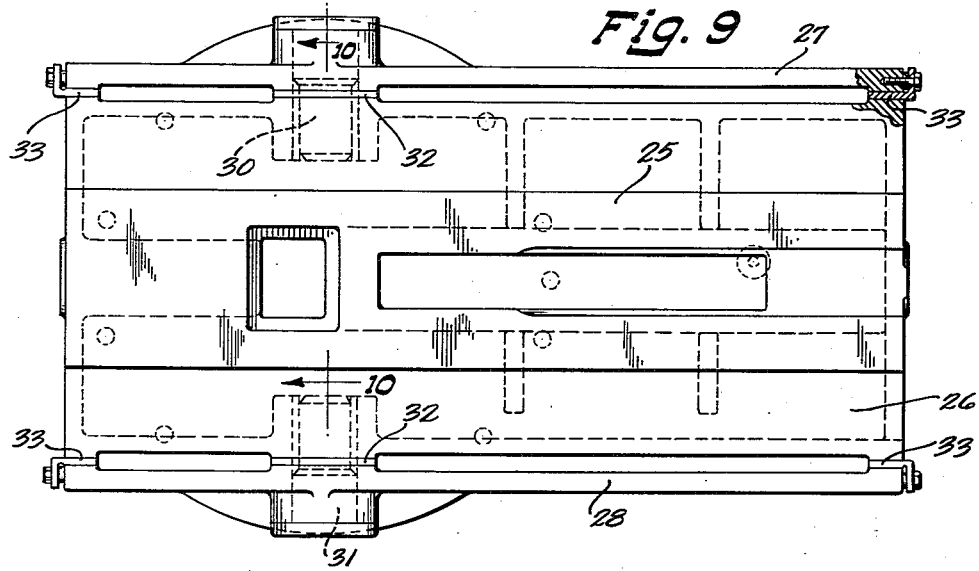
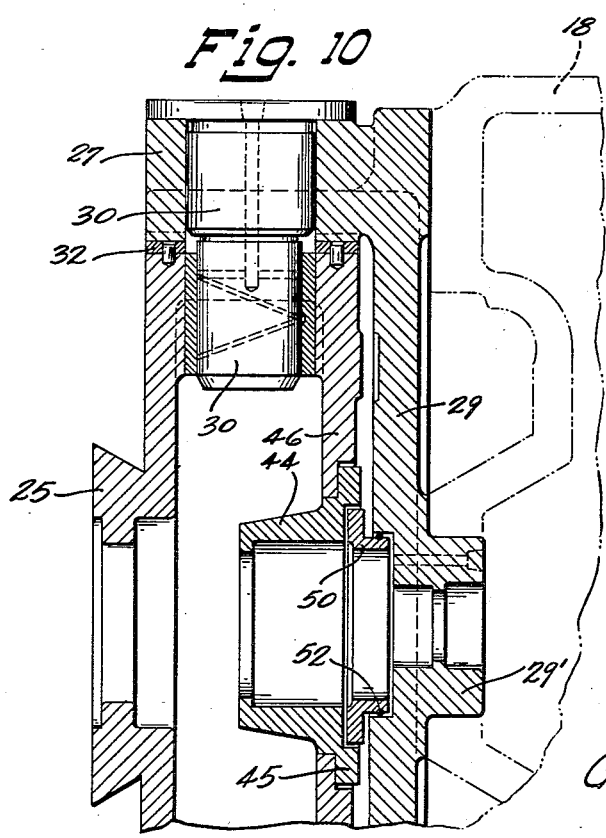
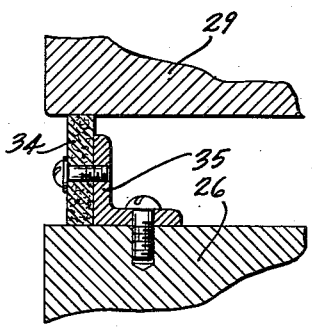

Sept. 11, 1956  G. P. MAURER  2,762,268
GEAR-CROWNING MACHINE
Filed Aug. 25, 1952  6 Sheets-Sheet 6

INVENTOR.
George P. Maurer
BY
Attorney

United States Patent Office 2,762,268
Patented Sept. 11, 1956

2,762,268

GEAR CROWNING MACHINE

George P. Maurer, Wauwatosa, Wis., assignor to The Falk Corporation, Milwaukee, Wis., a corporation of Wisconsin Application August 25, 1952, Serial No. 306,090

1 Claim. (Cl. 90—1.6)

This invention relates to gear crowning machines.

In the finishing of gears it is common practice to gradually relieve the faces and flanks of the gear teeth in a manner to produce a slight longitudinal taper at each tooth end. Gears thus treated are known as crowned gears, the tooth form being such that when meshed with a mating gear the load transmitting contacts therebetween are heaviest along mid-portions of the teeth and gradually diminish toward the ends thereof.

The purpose of crowning is to obtain a gear action that is smoother and quieter than would otherwise be possible, and to minimize gear failure by eliminating excessive loading at the tooth ends, a condition that otherwise commonly results from imperfect gear alignment or distortions under load.

Crowned gears are produced in gear finishing machines, such as gear grinders, shavers or the like, equipped with special mechanism automatically operable to effect a periodic predetermined adjustment of the gear blanks in timed relation with the finishing strokes of the machine. Machines thus equipped have proven quite satisfactory for gears of small and moderate sizes, but the weight and bulkiness of relatively large gears present crowning problems that have not heretofore been satisfactorily solved.

One object of the present invention is to provide a gear finishing machine capable of crowning large heavy gears. This I have accomplished by the provision in such a machine of means for automatically imparting to the finishing tool a predetermined periodic movement whereby the desired crowned effect may be produced without disturbing the position of the gear blank.

Another object is to provide a gear crowning attachment that may be readily applied to a conventional gear finishing machine and by which the desired crowning movements may be imparted to the finishing tool.

Another object is to provide a gear crowning machine in which the gear crowning movements of the finishing tool may be modified readily to accommodate gear blanks of various diameters and face widths.

Other more specific objects of the invention will appear, expressed or implied, from the following description of a gear crowning machine exemplifying the present invention.

For purposes of illustration and explanation, the invention is shown and will be described as embodied in a gear shaving machine, although it is applicable as well to gear grinding and other types of gear finishing machines.

In the accompanying drawings:

Fig. 7 is a top plan view of the mechanism shown in Fig. 4.

Fig. 8 is a view partly in horizontal section of the tool slide and associated parts.

Fig. 9 is a view in front elevation of the tool slide support.

Fig. 10 is a fragmentary vertical sectional view on a larger scale taken substantially along the line 10—10 of Fig. 9.

Fig. 11 is a detail sectional view of a dust seal.

The gear shaving machine shown is of a well-known type having a finishing tool in the form of a conventional gear-shaped shaving cutter 10 mounted to mesh with the gear G the surfaces of whose teeth are to be finished by the shaving action of the cutter thereon. In machines of this type the cutter 10 and gear G are mounted to rotate about their respective axes which are crossed at an angle of thirty degrees or less, one being rotatively driven and the other free to follow, one being caused to reciprocate relative to the other in a direction substantially parallel to the gear axis so as to effect a relative movement of the cutter across the face of the gear, and one being advanced toward the other to effect a slow relative feed movement of the cutter into the gear unil the shaving operation has been completed.

Figure 1:
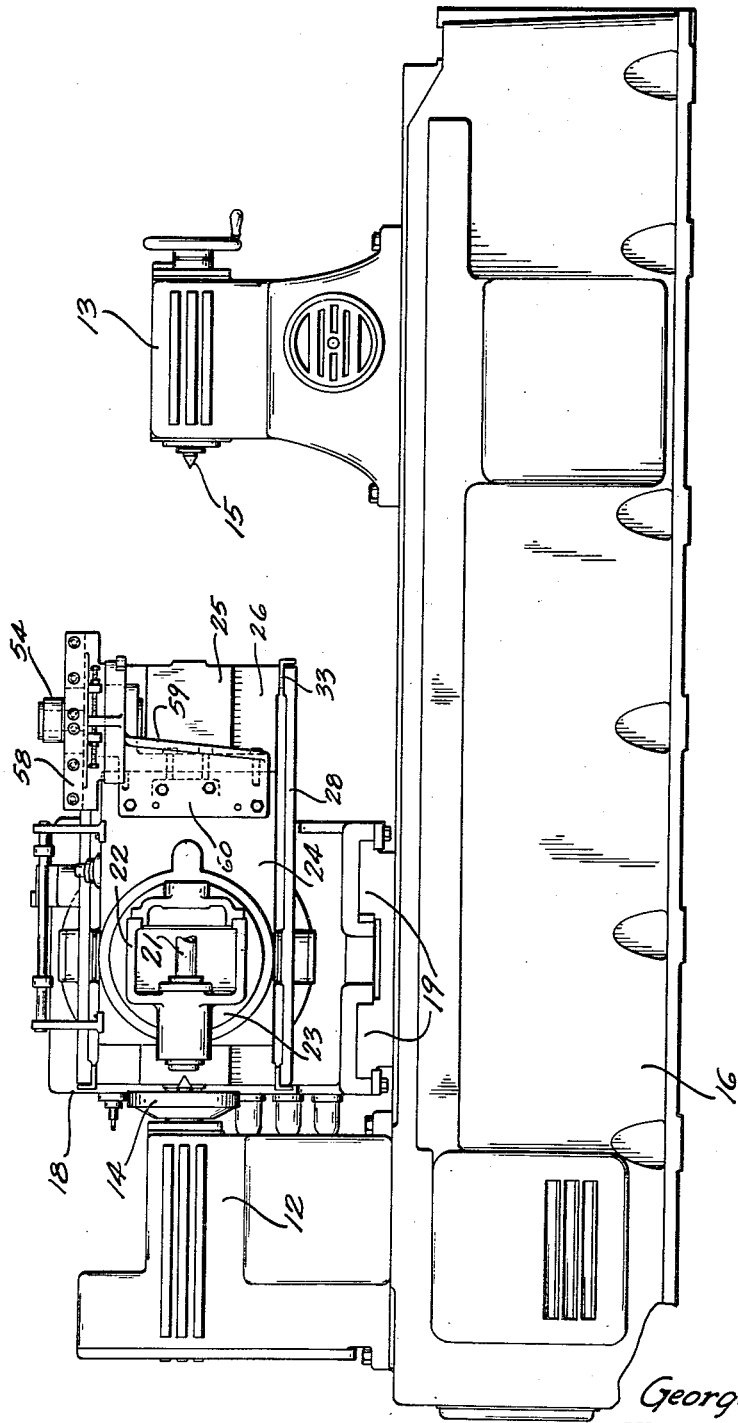
Figure 1 is a view in front elevation of a gear shaving machine equipped with a gear crowning attachment constructed in accordance with this invention.
Figure 2:
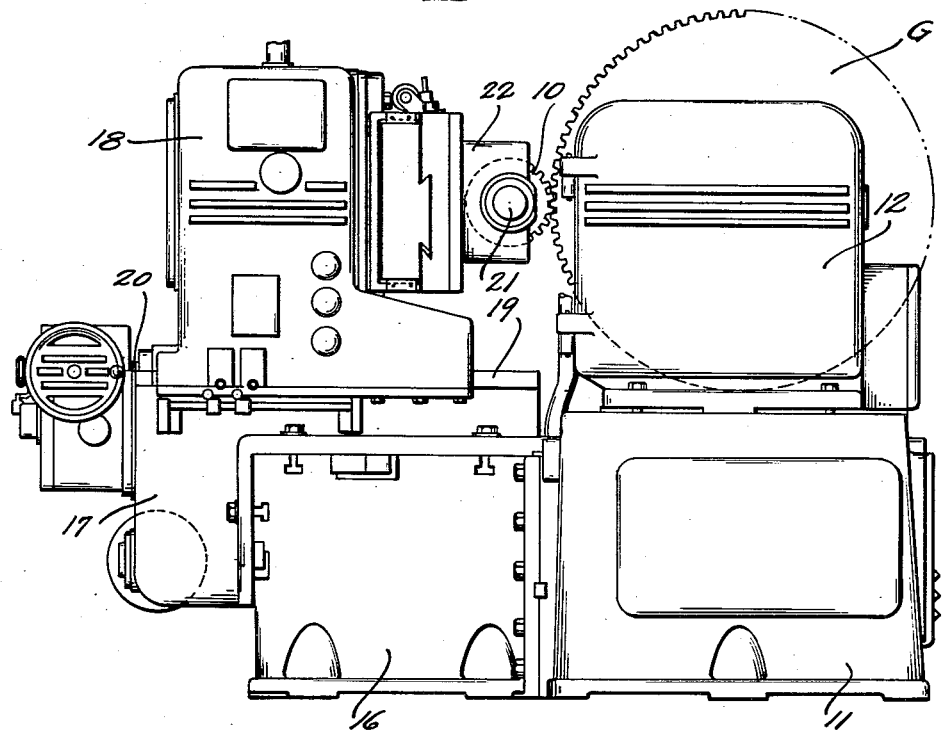
Fig. 2 is a view in end elevation.
Figure 3:
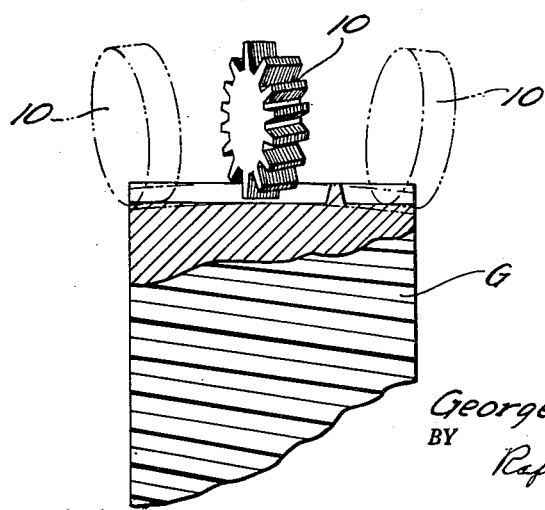
Fig. 3 is a diagrammatic view illustrating the motion imparted to the shaving cutter for gear crowning purposes.
Figure 4:
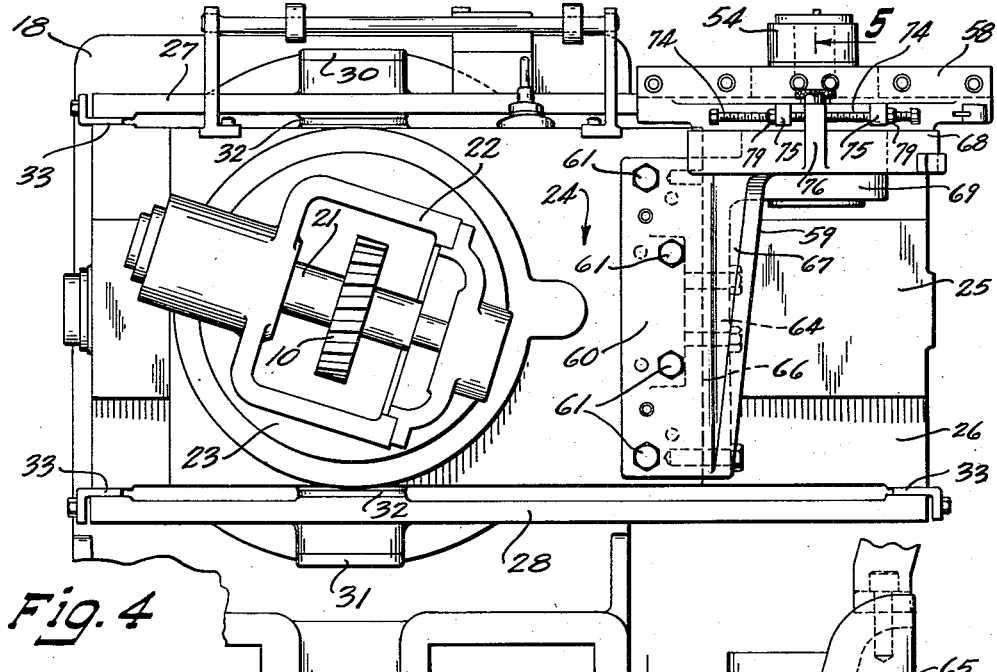
Fig. 4 is a front elevational view on a larger scale of the tool slide and associated crowning attachment.
Figure 5:
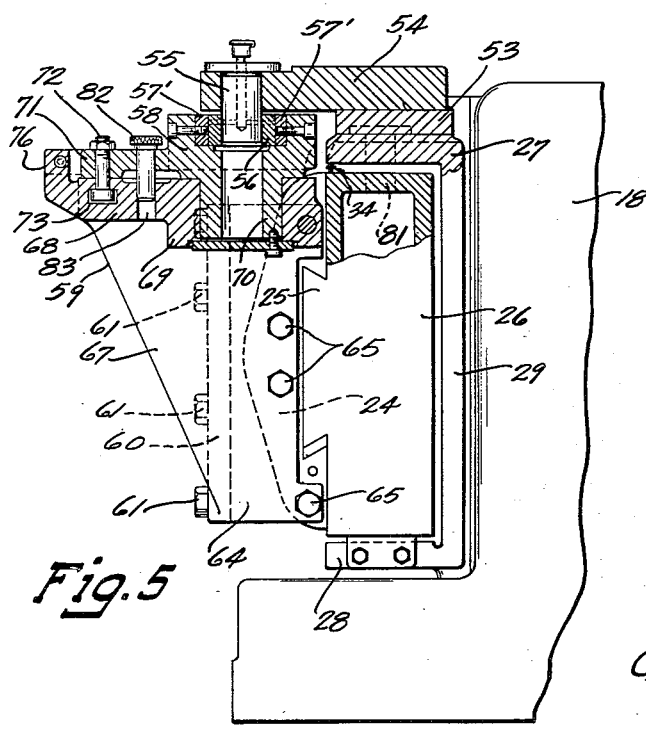
Fig. 5 is a vertical sectional view taken substantially along the line 5—5 of Fig. 4.
Figure 6:
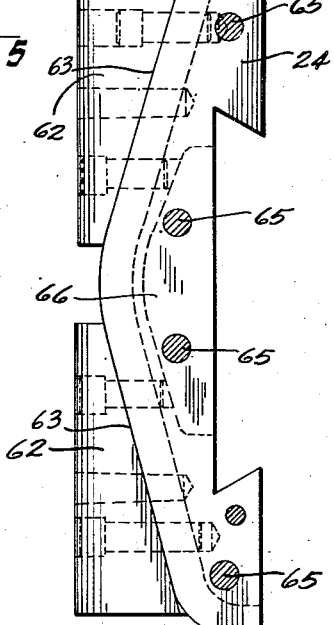
Fig. 6 is an end elevational view on a still larger scale of the tool slide equipped with an attached mounting pad for the crowning attachment.
Figure 12:
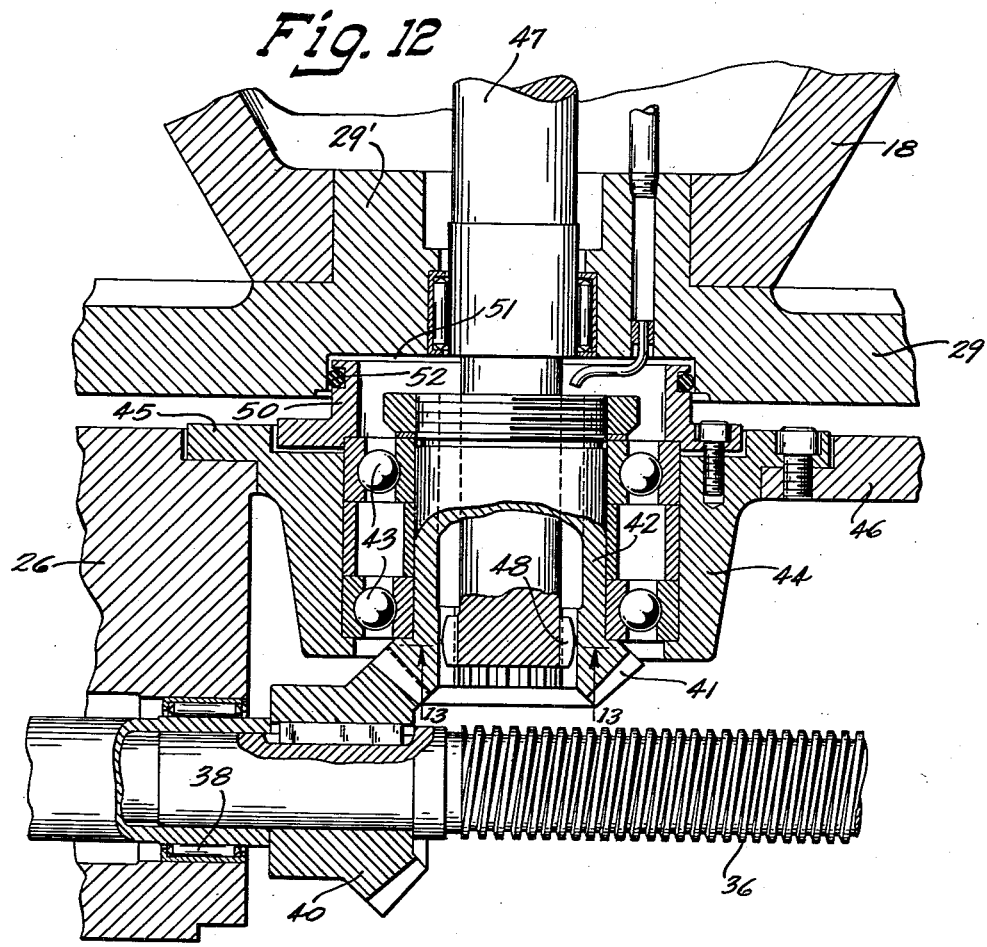
Fig. 12 is an enlarged detail sectional view of the feed screw drive mechanism shown in Fig. 8.

In this instance provision has been made in the machine shown to periodically modify the position of the cutter 10 during and in timed relation with the relative reciprocation between it and the gear G crosswise of the ends of the gear teeth and thereby produce the desired crowned effect. With the position of the cutter thus periodically modified, the relative reciprocating movement between the cutter and gear is along a curved rather than a straight path, as exaggeratedly indicated in Fig. 3, the cutter being periodically tilted in a manner to maintain the axis thereof substantially normal to the radius of curvature of the curved path.

The machine shown includes an elongated horizontal bed 11 having thereon suitable head and tail stocks 12 and 13, by and between which the gear G is supported in front of the cutter 10. It is, of course, understood that the gear is carried by a shaft (not shown) the head stock 12 having a conventional power driven rotating clamp head 14 for receiving and driving one end of said shaft, and the tail stock 13 having a conventional center 15 for centering and supporting the other end of the shaft. The tail stock 12 is preferably adjustable lengthwise of the bed 11 to accommodate gear supporting shafts of various lengths.

A second bed 16, rigidly attached to the back of the bed 11, provides support for a carrier 17 seated thereon. The carrier 17 is guided on and adjustable lengthwise of the bed 16 to permit proper positioning of the cutter 10 relative to the gear G. A carriage 18 seated upon the carrier 17, is accurately guided by suitable ways 19 for movement toward and from the gear supporting bed 11.

The carriage 18 is manually adjustable along the ways 19 to accommodate the cutter 10 to gears of various diameters and to advance and retract the cutter into and out of meshing engagement therewith. Provision is also made for automatically feeding the carriage 18 so as to advance the cutter 10 against the gear G during the shaving process. Mechanism for this purpose includes a feed screw 20 engaged with the carriage 18 and driven by suitable power actuated gearing (not shown) contained in the carrier 17.

The cutter 10 is shown fixed to and rotatable with a shaft 21 suitably journalled at its opposite ends in a frame 22. The frame 22 is carried by and projects forwardly from a circular head 23, rotatably mounted in the usual manner on a suitable tool slide 24, so as to permit angular adjustment of the shaft 21, and consequently the axis of the cutter 10, in a vertical plane substantially parallel to the axis of the gear G. This adjustment makes it possible to adapt the tool for use on spur gears and helical gears of various helix angles. The slide 24 is reciprocable along a suitable horizontal way 25 normally extending substantially parallel to the axis of the gear G and preferably adjustably supported in a manner about to be described. The slide 24 is reciprocated preferably by mechanism to be hereinafter described, so as to cause the cutter 10 to repeatedly traverse the face of the gear in the manner hereinabove mentioned.

Except for the exceptions above noted, the various mechanical parts hereinabove specifically mentioned are old and well known in the art, so that a further or more specific description thereof is deemed unnecessary.

In this instance the horizontal way 25 is shown formed on the forward face of a hollow rectangular structure 26 rockably supported between the upper and lower flanges 27 and 28 of a channel shaped frame 29. The frame 29 is rigidly attached to the front of the carriage 18 and extends horizontally beyond the same, a centering boss 29' serving to insure accurate registration of the frame thereon. As shown, particularly in Figs. 4, 7, 9, and 10, the structure 26 is journalled on a pair of heavy vertical aligned trunnions 30 and 31 respectively fixed in the upper and lower flanges 27 and 28 of the frame 29.

The structure 26 is also closely confined between upper and lower bearing washers 32 encircling the trunnions 30 and 31, and, also between bearing shoes 33 interposed between the end portions of the structure 26 and end portions of the flanges 27 and 28 to which the shoes are attached. All play between the structure 26 and frame 29 is thus eliminated except for the pivotal movement afforded by the trunnions 30 and 31. A suitable dust excluding strip 34 is preferably interposed between the structure 26 and frame 29 and secured in position by an appropriate bracket 35 attached to the structure 26.

Mechanism for reciprocating the tool slide 24 along the way 25 will now be described. Mechanism for this purpose, as shown particularly in Figs. 8, 12, 13 and 14, includes a horizontal feed screw 36 extending lengthwise of and within the structure 26 and journalled at one end in suitable bearings 37 and 38 fixed in said structure. Screw 36 is threaded in a suitable nut 39 attached to and projecting rearwardly from the slide 24. The screw 36 is driven by a bevel gear 40 fixed thereto adjacent the bearing 38 and meshing with a bevel gear 41 having an extended hollow hub 42 journalled in spaced bearings 43 fixed in a circular cage 44. The cage 44 is supported by an end flange 45, seated upon and removably attached to the rear wall 46 of the structure 26, and projects through said wall into the structure 26.

Figures 13, 14:
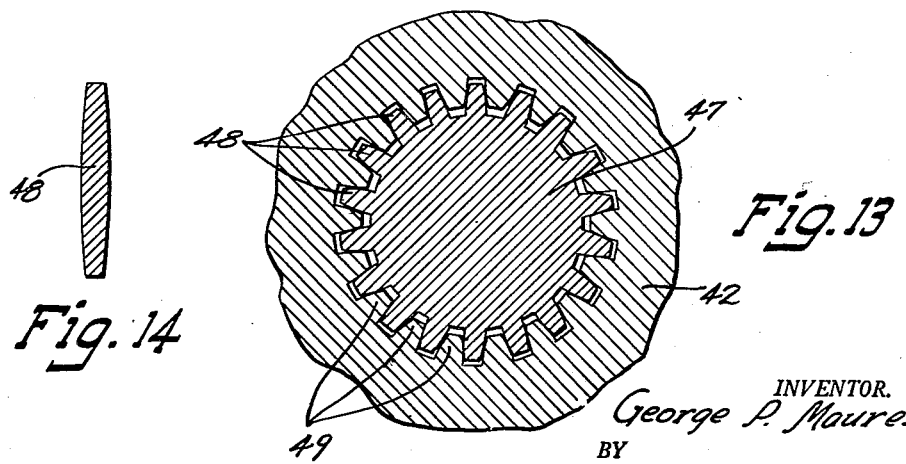
Fig. 13 is a further enlarged detail sectional view of a dental coupling shown in Fig. 12.
Fig. 14 is a longitudinal sectional view of a tooth of the coupling shown in Fig. 12.

The gear 41 is driven by a shaft 447 that extends horizontally from the interior of the carriage 18 and which is automatically driven in opposite directions alternately by mechanism of the kind commonly contained in the carriage 18 of machines of this type. In this instance, the shaft 47 extends loosely with the hub 42 of the gear 41 and has a series of teeth 48 thereon in meshing engagement with a corresponding series of teeth 49 formed within the hub 42. The teeth 48 are preferably crowned, as indicated in Fig. 14, to provide a freely flexible dental coupling capable of accommodating a limited angular displacement of the gear 41 relative to the shaft 47 without impairing the smoothness of the driving action therebetween. This dental coupling is preferably so disposed that the common vertical axis of the trunnions 30 and 31 extends through the center thereof, so that the limited pivotal action of the structure 26 about said axis is accommodated.

A collar 50 rigidly attached to the rear end of the cage 44 and projecting loosely into a circular recess 51 formed in the frame 29, carries and holds a sealing ring 52 against the peripheral wall of the recess 51 in all pivotal positions of the structure 26 so as to maintain a dust excluding seal between the structure 26 and carriage 18.

In the machine shown the above described pivotal mounting of the structure 26 within the frame 29 is utilized to modify the position of the tool slide 24 and tool 10 during travel thereof lengthwise of the way 25 in order to produce the desired crowned effect on the gear G. For this purpose provision is made for automatically effecting and accurately controlling a tilting action of the structure 26 about the axis of the trunnions 27 and 28 during travel of the tool slide 24 on the way 25. Mechanism for this purpose, best shown in Figs. 4, 5, 6, and 8, will now be described.

Seated on that end of the frame 29 that extends horizontally beyond the carriage 18, and particularly on the upper flange 27 thereof, is a plate 53 bolted or otherwise rigidly secured thereto. A rigid arm 54, rigidly joined to the plate 53 and projecting forwardly therefrom, has a large pin 55 fixed therein and projecting downward therefrom. The lower end of the pin 55 has a close rotative fit within a shoe or block 56 closely fitted for lengthwise travel between bearing strips 57' fixed in a straight cam slot or channel 57 formed in a heavy guide bar 58. The bar 58 is adjustably mounted on a suitable bracket attached to the tool slide 24 for travel therewith.

The bracket shown at 59 includes a vertically extended flange 60 attached by bolts 61 or the like to two aligned adapter blocks 62 bolted or otherwise secured to the front sloping faces 63 of the tool slide 24. Another vertically extended flange 64, integral with and at right angles to the flange 60, is secured by bolts 65 or the like to the end face 66 of the tool slide. The upright flanges 60 and 64, together with an upstanding forwardly projecting web 67, provide support for a horizontal semi-circular plate 68 formed integral therewith and having a thickened hub portion 69 on which the bar 58 is seated. The hub 69 is bored to receive an integral pintle 70 disposed centrally of the bar 58 and depending therefrom. The pintle 70 has a close rotative fit within the hub 69. The bar 58 is thus angularly adjustable about an axis fixed relative to the tool slide 24.

The bar 58 may be secured in any position of adjustment by any appropriate means such as an arcuate plate 71 projecting horizontally therefrom and overlying the bracket plate 68, one or more clamp bolts 72 carried by the plate 71 and engaged in a T-slot 73 formed in the plate being effective to releasably hold the bar 58 in adjusted position.

In order to effect a fine angular adjustment of the bar 58 a pair of opposed jack screws 74 are provided, each threaded in a lug 75 projecting from the upper plate 71 and each adapted to bear against an intermediate lug 76 projecting from the lower plate 68. When the desired angular position of the bar 58 has been obtained, it may be securely locked against further adjustment by tightening both screws 74 against the lug 76 and then locking them by tightening the lock nuts 79 thereon.

When it is desired to finish a gear without producing a crowned effect, the structure 26 may be securely locked against tilting by the use of locking pins 80 (Fig. 7) which may be projected through the upper flange 27 of the frame 29 into appropriate holes 81 (Fig. 5) in the structure 26. With the structure 26 thus locked in place, the way 25 is retained in a position parallel to the axis of the gear G, and, consequently, the tool slide 24 and cutter 10 follow a straight course as the latter traverses the face of the gear, in exactly the same manner as in a standard gear shaving machine of the general type herein illustrated.

However, when it is desired to produce a crowned effect on the gear G, the locking pins 80 are withdrawn and the bar 58 is adjusted toward the angular position shown in the broken lines in Fig. 7, the angularity therein indicated being somewhat exaggerated. The magnitude of the crown is determined by the magnitude of the angle at which the bar 58 is set, and great care therefore must be exercised in setting this bar at the correct angle. To accomplish this, the bar 58 is first initially locked in the full line position shown by inserting a locking pin 82 through the upper plate 71 into a hole 83 in the lower bracket plate 68, and that position is duly registered on a conventional indicator 90. Thereafter, the pin 82 is withdrawn and the bar 58 is adjusted into the particular angular position desired, as indicated by the indicator 90.

With the bar 58 thus angularly set and traveling with the tool slide 24 along the way 25, the bar reacts on the stationary pin 55 to effect a pivotal movement of the structure 26 and way 25 about the vertical trunnions 30–31 in timed relation with the reciprocating movements of the tool slide. This pivotal action of the way 25 is, of course, imparted to the tool slide and cutter, causing the latter to depart from its normal straight line reciprocation and to follow a curved path across the face of the gear. The degree of curvature of this path is, of course, adjustable and determinable by the angular position to which the bar 58 is set.

In this connection it will be noted that as the tool slide 24 and cutter 10 travel past the vertical trunnions 30–31 toward the right end of the pivoted structure 26, the angularly disposed bar 58 reacts on the stationary pin 55 to swing that end of the structure 26 and, consequently, the cutter 10 toward the gear G, thereby to increase the cutting or shaving pressure as the cutter approaches the ends of the gear teeth at one side of the gear face. Similarly, the right end of the pivoted structure 26 is depressed away from the gear and the left end thereof is advanced toward the gear by the reaction between the bar 58 and pin 55 during travel of the cutter in the opposite direction, so that, as the cutter 10 passes the mid-point of its travel toward the left end of the structure 26 it is again advanced toward the gear in a manner to again increase the cutting or shaving pressure as the cutter approaches the ends of the gear teeth at the left side of the gear face. It will, of course, be understood that by thus increasing the cutting or shaving pressure as the cutter approaches the ends of the gear teeth, the desired crowned effect is obtained.

From the foregoing it will also be noted that the cutter 10 is not only advanced and retracted toward and from the gear by the pivotal action of the structure 26, but that it is also tilted by the same action, so that in its travel along the curved path above described its axis remains substantially normal to the radius of curvature of that path in all positions of the cutter along the path, a condition that is highly desirable for a satisfactory shaving action.

Various changes may be made in the embodiment of the invention hereinabove specifically described without departing from or sacrificing the advantages of the invention as defined in the appended claim.

I claim:

In a gear finishing machine the combination of a gear support, a carriage, a member mounted on said carriage for pivotal movement about an axis fixed relative thereto, said member extending lengthwise of the gear axis, a tool carrier slide guided for reciprocation lengthwise of and on said member, a power driven shaft journalled in said carriage, means carried by said member for reciprocating said slide, and a flexible coupling through which said last named means is driven by said shaft, said coupling being disposed so that said pivotal axis extends substantially through the same, and means for tilting said member during lengthwise movement of said slide thereon.

References Cited in the file of this patent
UNITED STATES PATENTS

| | | |
|---|---|---|
| 2,157,981 | Drummond | May 9, 1939 |
| 2,362,763 | Miller | Nov. 14, 1944 |
| 2,542,569 | Praeg | Feb. 20, 1951 |
| 2,557,462 | Praeg | June 19, 1951 |